(12) United States Patent
Staudinger et al.

(10) Patent No.: US 7,975,474 B2
(45) Date of Patent: Jul. 12, 2011

(54) HYDRAULIC SYSTEM

(75) Inventors: Martin Staudinger, Ettlingen (DE);
Laurent Ineichen, Strasbourg (FR);
Marco Grethel, Bühlertal (DE); Eric Müller, Kaiserslautern (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 501 days.

(21) Appl. No.: 12/074,711

(22) Filed: Mar. 5, 2008

(65) Prior Publication Data

US 2008/0216471 A1    Sep. 11, 2008

Related U.S. Application Data

(60) Provisional application No. 60/904,998, filed on Mar. 5, 2007, provisional application No. 60/936,538, filed on Jun. 21, 2007.

(51) Int. Cl.
*F16D 31/02* (2006.01)

(52) U.S. Cl. .......................................... 60/413

(58) Field of Classification Search ............... 60/413, 60/418
See application file for complete search history.

(56) References Cited

U.S. PATENT DOCUMENTS

| 5,377,717 A | 1/1995 | Toogood et al. ............... 137/101 |
| 5,826,487 A * | 10/1998 | A'Hearn .......................... 60/413 |

FOREIGN PATENT DOCUMENTS

| DE | 36 41 801 A1 | 6/1988 |
| DE | 41 30 128 A1 | 3/1993 |
| DE | 44 10 268 A1 | 9/1994 |

* cited by examiner

*Primary Examiner* — Michael Leslie
(74) *Attorney, Agent, or Firm* — Alfred J. Mangels

(57) ABSTRACT

A hydraulic system including a pump for feeding hydraulic fluid from an inlet side to an outlet side. A pressure accumulator is disposed at the outlet side, and between the pump and the pressure accumulator a hydraulic control valve is disposed, which has at least two valve positions. The outlet side of the pump is connected to the pressure accumulator in a second valve position, and is separated from the pressure accumulator in a first valve position. The outlet side of the pump is connected to the inlet side through the control valve in the first valve position.

24 Claims, 3 Drawing Sheets

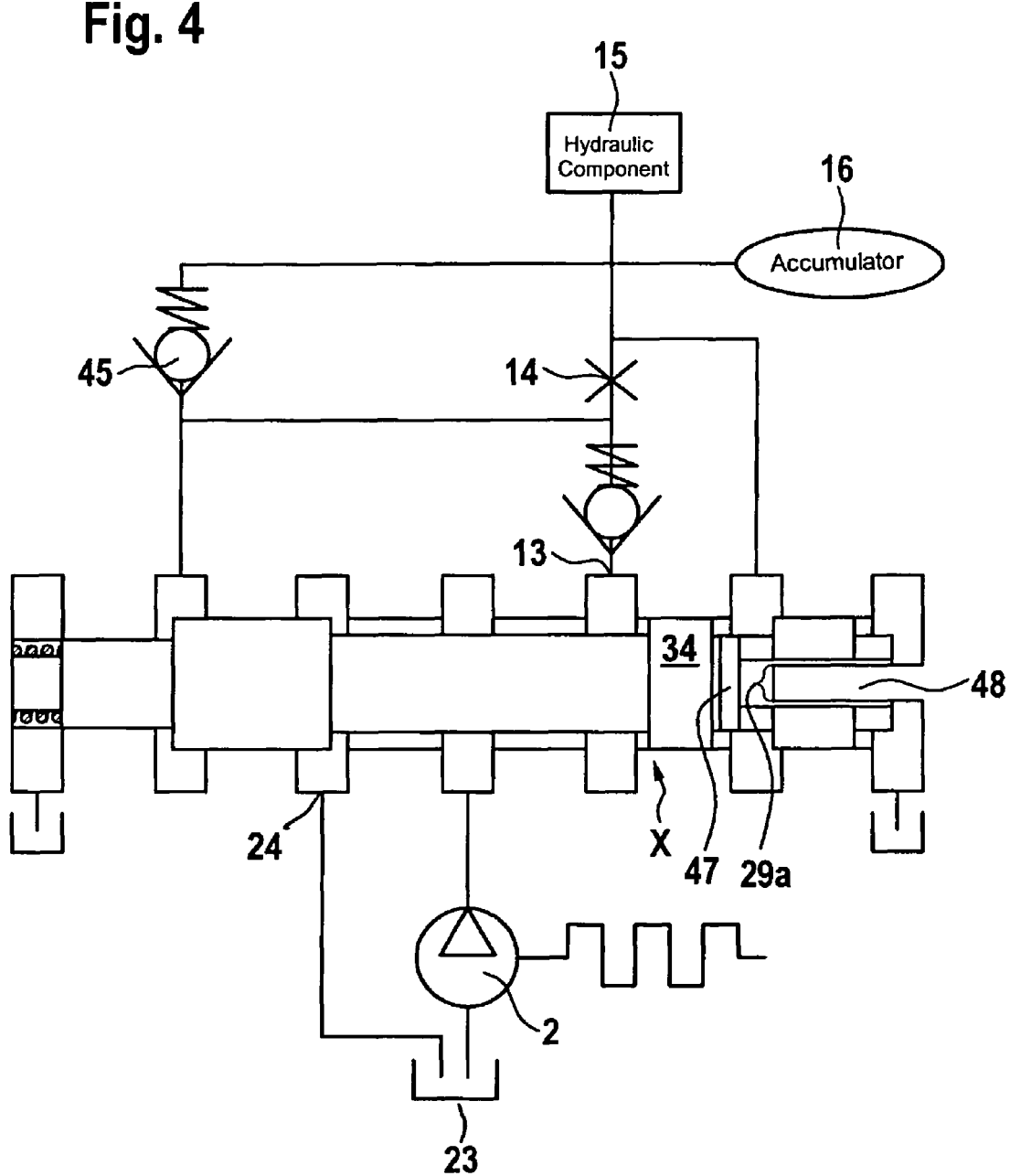

HYDRAULIC SYSTEM

BACKGROUND OF THE INVENTION

1. Field of the Invention

The present invention relates to a hydraulic system that includes a pump for feeding hydraulic fluid from a pump inlet side to a pump outlet side, wherein a pressure accumulator is disposed on the outlet side as well as a control valve for use in such a hydraulic system.

2. Description of the Related Art

In order to provide hydraulic pressure in a motor vehicle, there are three basic known approaches: a hydraulic pump directly driven by an internal combustion engine; a hydraulic pump driven by an electric motor. Either a hydraulic pressure accumulator is filled by the hydraulic pump, or the hydraulic pump-is regulated in accordance with the respective requirements. Hydraulic drives are used in vehicles in many ways, e.g., for operating a variable speed drive unit of a continuously variable transmission, for shifting an automatic transmission, or the like. Such hydraulic subsystems are subsequently designated as hydraulic components, as opposed to the pressure generation unit, which constitutes an independent hydraulic system in the sense of the present invention.

In particular, when the pump of the hydraulic system is directly driven by a crankshaft of an internal combustion engine, the problem arises that a comparatively high shaft power is consumed by the pump, even when hydraulic fluid is not utilized by a hydraulic component.

It is therefore an object of the present invention to provide a hydraulic system whose shaft power for driving the pump is reduced, in particular in operating phases in which no volumetric flow or only a very small volumetric flow is received by a hydraulic component.

SUMMARY OF THE INVENTION

The above-stated object is achieved by a hydraulic system that includes a pump for feeding hydraulic fluid from an inlet side to an outlet side, and wherein a pressure accumulator is disposed at the pump outlet side. Between the pump and the pressure accumulator a hydraulic control valve is disposed, which control valve includes at least two valve positions. The outlet side of the pump is connected to the pressure accumulator in a first valve position, and is separated from the pressure accumulator in a second valve position. In the second valve position the outlet side of the pump is connected with the inlet side through the control valve, and an orifice plate is positioned between the outlet side of the pump and a second, feedback surface of the control valve. In the second valve position the pump is thus indirectly short-circuited by means of additional hydraulic elements, or directly short-circuited. The inlet and the outlet sides of the pump are directly connected to the tank, for example, by means of the control valve. Thus, the hydraulic system has the advantage of managing without auxiliary electromagnetic force or electronic regulation.

It is preferably provided that the valve position of the control valve is controlled by the pressure in the pressure accumulator. Thereby no additional electronic control or regulation system, for example, is necessary for that purpose. The control valve thus preferably includes a moveable means that includes two oppositely acting pressure surfaces with a different effective hydraulic surface area, which determines the valve position, and wherein the pressure surface with the smaller effective hydraulic surface area is acted upon by a pilot pressure that is a function of the valve position.

Preferably, it is provided that the control valve includes a valve piston having different effective hydraulic surface areas at the feedback surfaces disposed at its opposite axial end surfaces, wherein the feedback surface having the smaller surface area is acted upon by the force of a biasing spring. In the event of movement of the valve piston in the direction of the feedback surface having the smaller surface area the second valve position is approached, and in the direction of the feedback surface having the larger surface area the first valve position is approached. The position of the valve piston thus depends upon the pressure within the pressure accumulator.

Preferably a restriction, also designated as an orifice plate, is disposed between the control valve and the pressure accumulator, and the feedback surface with the smaller surface area is acted upon by the pressure at the side of the restriction that is connected to the control valve, and the feedback surface with the larger surface area is acted upon by the pressure on the side of the restriction connected to the pressure accumulator. The restriction causes a pressure drop, so that different pressures act on both of the feedback surfaces.

It is preferably provided that the side of the restriction connected to the control valve is connected to the tank through a check valve having a spring. The spring constant of the spring controls the opening pressure of the check valve, as is the case in the subsequently referred to check valves having springs. The check valve limits the maximum pressure in the hydraulic system. Preferably, it is thus furthermore provided that the side of the restriction that is connected to the control valve is connected to the outlet side of the pump through a check valve, preferably a check valve having a spring. That check valve reduces pressure spikes when shifting the control valve.

In an alternative embodiment it is provided that the orifice plate is bridged by a check valve, preferably by a check valve having a spring. That check valve increases the flow-through volume at a high volumetric flow and thus limits the pressure difference at the orifice plate. Preferably, it is thus furthermore provided that the outlet side of the pump is connected to the tank through a check valve having a spring. That check valve reduces pressure spikes when shifting the control valve.

It is preferably provided that the hydraulic system is disposed in a motor vehicle and the pump is driven by a crankshaft of an internal combustion engine in a permanent manner, and thus is not separated by a clutch.

The object mentioned above is also accomplished by a control valve for use in a hydraulic system in accordance with one of the embodiments described above, wherein the control valve includes a moveable means that determines the valve position. The movable means includes two pressure surfaces acting in opposite directions with a different effective hydraulic surface area, wherein the pressure surface with the smaller hydraulic effective surface area is acted upon by a biasing force that is a function of the valve position. An orifice plate is provided between the outlet side of the pump and a second feedback surface of the control valve. Thereby a passive control valve (a pressure-regulating valve) can be realized, which means that no auxiliary electromagnetic force or electronic control is required.

It is preferably provided that the control valve includes a valve piston that has opposite axial end surfaces having different hydraulically effective surface areas at its feedback surfaces. The feedback surface having the smaller surface area is acted upon by the force of a biasing spring, wherein during movement of the valve piston in the direction of the feedback surface having the smaller surface area the second valve position is approached, and in the direction of the feedback surface having the larger surface the first valve position is approached.

BRIEF DESCRIPTION OF THE DRAWINGS

The structure, operation, and advantages of the present invention will become further apparent upon consideration of the following description taken in conjunction with the accompanying drawings, in which:

FIG. 4 is a modification of the hydraulic circuit diagram shown in FIG. 3.

DESCRIPTION OF THE PREFERRED EMBODIMENTS

Figure 1:
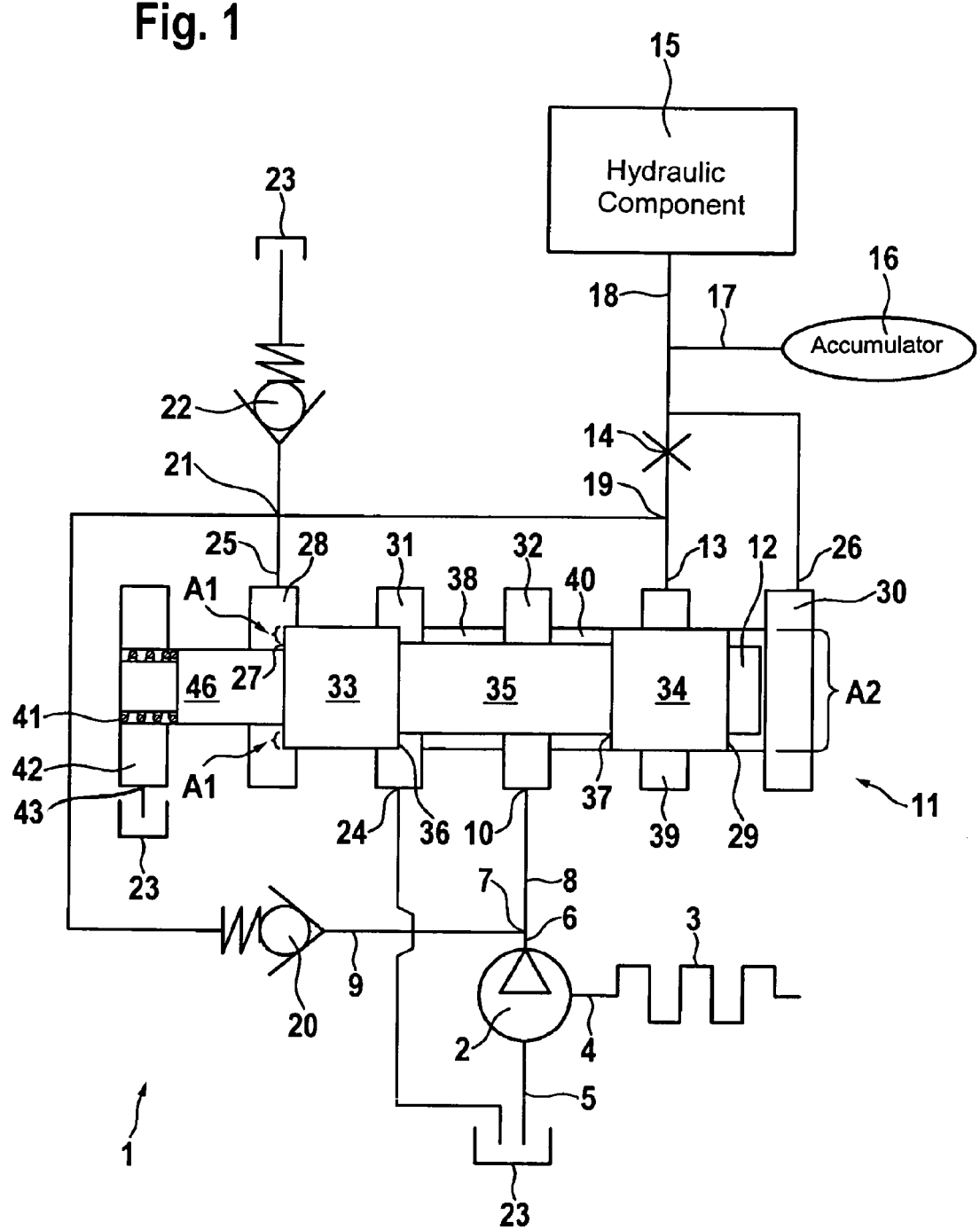
FIG. 1 is a hydraulic circuit diagram of a first embodiment of a hydraulic system in accordance with the present invention.

FIG. 1 shows a schematic hydraulic diagram of an embodiment of a hydraulic system 1 in accordance with the present invention. Hydraulic system 1 includes a pump 2 that is driven by an internal combustion engine 3, which drives an input shaft of the pump 2 directly or indirectly by the crankshaft of the internal combustion engine 3. The drive shaft 4 can be directly connected to the crankshaft, for example, but it can also be driven by the crankshaft through a toothed gear or through a continuously variable transmission. As soon as the internal combustion engine 3 is in operation, the pump 2 is being driven.

The pump 2 includes an inlet side 5 and an outlet side 6. The inlet side 5 of the pump 2 is connected to a tank 23, which is not under pressure. The tank can be under ambient pressure, or it can be at a higher or at lower pressure than the ambient pressure in an enclosed hydraulic system. Hydraulic fluid flowing into or being drawn into the pump 2 on the inlet side 5 goes through a pressure increase by means of the pump 2 and is discharged at the outlet side 6 to provide a volumetric flow Q of hydraulic fluid that flows through the pump 2. On the outlet side 6 of the pump 2 is a branch 7 at which the outlet side 6 branches into a valve inlet conduit 8 and an output conduit 9. The valve inlet conduit 8 is connected to a pump side inlet 10 of a control valve 11.

Control valve 11 includes several hydraulic inputs and several hydraulic outputs, which can be connected to each other or separated from each other, depending upon the position of a moveable valve piston 12. The function of the control valve 11 is hereinafter described in more detail. An outlet 13 of control valve 11 is connected to a hydraulic component 15 through a restriction in the form of an orifice plate 14. The hydraulic component can be, for example, a parallel shift transmission, an automated shift transmission, a continuously variable transmission (CVT), an automatic transmission, or the like.

A pressure accumulator 16 is disposed between the orifice plate 14 and the hydraulic component 15. The pressure in the pressure accumulator is $p_s$. As is known in the art, the pressure accumulator 16 can be a piston acting against a spring force, or the like. The pressure accumulator 16 is connected to a hydraulic conduit 18 at a point between the orifice plate 15 and the hydraulic component by a supply line 17. Between the orifice plate 14 and the outlet 13 there is a junction 19, which is connected to the output conduit 9. In the output conduit 9 a check valve 20 is disposed, which opens when the pressure difference between the outlet 6 of pump 2 and the branch-off location 19 exceeds a predetermined value. The check valve is loaded by a spring, like the subsequently mentioned check valves. The spring presses a valve slide, for example a ball, into a valve seat. The spring constant of the spring determines the check valve opening pressure. The check valve thus opens in an opening direction only when the value of a certain pressure difference on both sides of the check valve is exceeded, and it blocks the check valve in a blocking direction independent of the pressure difference below the predetermined pressure difference value. The opening direction of the check valves is in the illustrated branch in the direction towards the circle, in the case of the check valve 20 in the direction from the tank 23. In the output conduit 9 another branch-off 21 is disposed, which connects the output conduit 9 through another check valve 22 to an unpressurized tank 23.

The control valve 11 also includes a tank side outlet 24, which is directly connected to the tank 23. The junction 21 of the output 9 is connected to a first control inlet 25 of the control valve 11. The hydraulic conduit 18 between the orifice plate 14 and the hydraulic component 15 is connected to a second control inlet 26 of the control valve 11. The valve piston 12 includes a first feedback surface 27 that is disposed in an annular chamber 28, which is connected to the first control inlet 25. The valve piston 12 also includes a second feedback surface 29 that is disposed in an annular chamber 30, which is connected to the second control inlet 26. An annular chamber 31 is connected to the tank side outlet 24, an annular chamber 32 is connected to the pump side inlet 10, and an annular chamber 39 is connected to the junction 19.

The valve piston 12 includes a first control cylinder 33 and a second control cylinder 34, which are connected to each other by a connecting member 35. The first control cylinder 33 includes a first control edge 36, and the second control cylinder 34 includes a second control edge 37. The first control cylinder 33 transitions into a trunnion 46, which is used for the sliding support of the valve piston 12. Depending upon the position of the valve piston 12, there is a connection between the annular cavities 31 and 32 through a connection channel 38, or through a connection between the annular cavities 39 and 32 through a connection channel 40.

The positioning of the control edges is so selected that in a first valve position I the two annular cavities 31 and 32 are connected, so that the pump side inlet 10 is connected to the tank side outlet 24, or that in a second valve position II the annular cavities 32 and 39 are connected, so that the pump side inlet 10 is thus connected to the outlet 13. In FIG. 1 the first valve position I is shown, in which the pump side inlet 10 is connected to the tank side outlet 24, and the pump 2 thus pumps hydraulic fluid directly from the tank 23 back into the tank. The pump 2 is short-circuited in that manner and operates in a by-pass mode.

Figure 2:
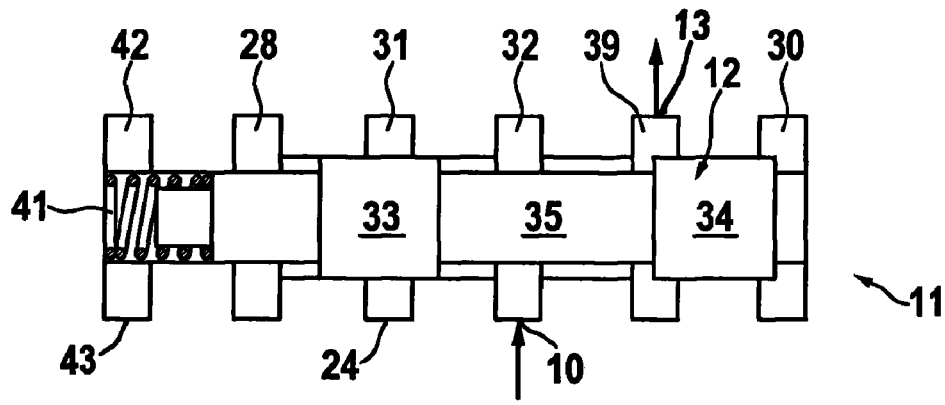
FIG. 2 is a longitudinal view of the interior of a control valve within the hydraulic circuit shown in FIG. 1 and in a second valve position.

In FIG. 2 the second valve position II is shown, in which the connection between the pump side inlet 10 and the tank side outlet 24 is blocked, and the connection between the pump side input 10 and the outlet 13 is open. The pump 2 pumps hydraulic fluid in the direction of the hydraulic component 15 and into the pressure accumulator 16. During that process the orifice plate 14 causes the pressure on the pump side of the orifice plate 14 to be higher than the pressure on the side of the orifice plate 14 facing the hydraulic component 15 or the pressure accumulator 16. As a consequence, the pressure in the annular chamber 28, which acts on the first feedback surface 27, is higher than the pressure in the annular chamber 30, which acts on the second feedback surface 29. The valve piston 12 is also urged into the valve position illustrated in FIG. 2 by a biasing spring 41. The control valve also includes an annular chamber 42 that surrounds the biasing spring 41 and that is connected to the tank 23 by means of a leakage conduit 43.

The first feedback surface 27 includes an effective hydraulic surface A1, which is the annular surface at the end of first control cylinder 33, between the outer periphery of first control cylinder 33 and the outer periphery of trunnion 46. The second feedback surface 29 includes an effective hydraulic surface A2, which corresponds with the end surface of second control cylinder 34. The effective hydraulic surface A2 of the second feedback surface 29 has a surface area that is larger than the surface area of the effective hydraulic surface A1 of the first feedback surface 27, because the trunnion 46 does not have a surface against which hydraulic pressure acts and that is an effective hydraulic surface in the axial direction of the valve piston 12. Because the biasing spring 41 of the valve piston 12 acts against the valve piston 12 in the direction of the valve position shown in FIG. 2, the force of the biasing spring 41 is added to the pressure force that acts against the first feedback surface 27, which together act in opposition to the pressure force that acts against the second control surface 29.

When valve piston 12 is at rest, the sum of the force of the biasing spring 41 and of the force exerted against the first feedback surface 27 by virtue of the hydraulic pressure acting thereon are therefore equal to the force exerted against the second control surface 29 by virtue of the hydraulic pressure acting thereon. The valve piston 12 is at a stop in the respective positions; only shortly before the shifting points are reached, there is force equilibrium for a short period of time. When the pressure accumulator 16 is being filled, the pressure in the system rises, so that the pressure upstream of the orifice plate and also downstream the orifice plate 14 rises. Thereby the pressures acting on the feedback surfaces 27 and 29 also rise. From a certain system pressure the force acting against the second feedback surface 29 exceeds the sum of the forces of the biasing spring 41 and the force acting against the first feedback surface 27, since the effective hydraulic surface A2 of the second feedback surface 29 is larger than the effective hydraulic surface Al of the first feedback surface. As a result the valve piston 12 moves into the position shown in FIG. 1.

When hydraulic fluid is withdrawn from the pressure accumulator 16 by the hydraulic component 15 the pressure in the pressure accumulator 16 drops. When the pressure drops below a certain threshold value, the sum of the hydraulic pressure force acting on the smaller hydraulic surface A1 and the force of the biasing spring 41 becomes larger than the hydraulic pressure force acting on the larger hydraulic surface A2, so that the valve piston 12 then again moves into the position shown in FIG. 2. In that way the control valve 11 shifts in a pressure controlled manner between a bypass mode for pump 2, that is, the valve position I that is shown in FIG. 1, and a pump mode in which hydraulic fluid is fed to the pressure accumulator 16 or to the hydraulic component 15, that is, the valve position II shown in FIG. 2. The shifting pressure only is a function of the ratio of the areas of the hydraulically effective surfaces A1 and A2 and on the spring constant of the biasing spring 41, and thus it can be adapted to the respective prevailing pressure conditions at will.

The control edges 36 and 37, or the disposition of the control cylinders 33 and 34, is so selected that a connection of the three annular cavities 31, 32, and 39 never occurs simultaneously. The result is an intermediate position in which there is no connection between the annular cavities 31 and 32, or between annular cavities 32 and 39. That intermediate position would lead to a rapid pressure rise on the outlet side 6 of the pump 2. In order to reduce that rapid pressure rise the check valve 20 is provided. It reduces the briefly occurring pressure spike on the hydraulic component side. In order to limit the pressure, which can be built up in the system the check valve 22 is additionally provided. It opens as soon as the pressure at the outlet 13 of the control valve 11 exceeds a maximum value. If the check valve 20 opens at a lower pressure than the check valve 22, both of them also open when the pressure on the outlet side of the pump 2 exceeds the maximum pressure predetermined by the opening pressure of the check valve 22.

When starting the internal combustion engine with the pressure accumulator still empty, the only force acting upon the valve piston 12 is the spring force of spring 41. That means that the piston is disposed in the position shown in FIG. 2. The pump 2 thus feeds hydraulic fluid into the pressure accumulator 16. The hydraulic fluid, which flows through the orifice plate 14, is at a pressure differential, so that a higher pressure acts on the first feedback surface 27 than on the second feedback surface 29. Because the second feedback surface 29 has an area that is larger than that of the first feedback surface 27, the force acting on the valve piston through the second feedback surface 29 at maximum pressure, is larger than the sum of the spring force and the hydraulic pressure force acting on the first feedback surface 27. Thus, the piston starts moving to the left in the representations shown in FIGS. 1 and 2, until the second control edge 37 closes the connection between the pump 2 and the pressure accumulator 16. Because at that moment the volumetric flow at the orifice plate 14 collapses, the force at the first feedback surface 27 also decreases, and thereafter the piston rapidly runs to the left stop as shown in FIG. 1, and the pump 2 feeds the hydraulic fluid through a loop without pressure. Through the leakage in the hydraulic system and/or oil consumption, the pressure accumulator 16 runs out until a minimum pressure $P_{min}$ is reached. At that point in time the sum of the hydraulic pressure force acting against the first feedback surface 27 and the force of spring 41 exceeds the hydraulic pressure force acting against the second feedback surface 29. The valve piston 12 thus moves to the right again, until the control edge 37 moves to within annular conduit 39 to provide an opening in the direction of the hydraulic component of the hydraulic system. At that point in time the volumetric flow through the orifice plate 14 builds up again, which causes a pressure difference between the first feedback surface 27 and the second feedback surface 29. The hydraulic pressure force acting on the first feedback surface 27 thus increases rapidly. Thus, the valve piston 12 moves completely to the right stop as shown in FIG. 2, and the pressure accumulator 16 is filled.

Figure 3:
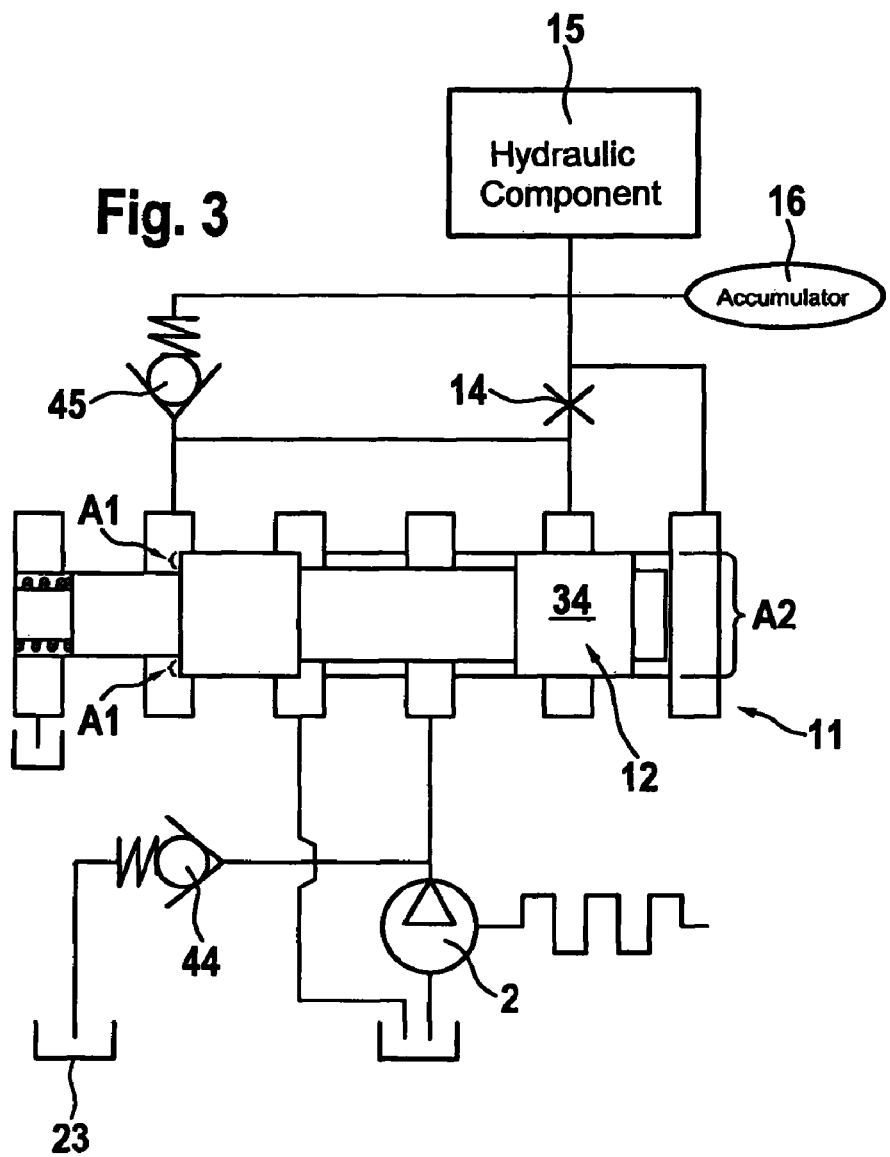
FIG. 3 is a hydraulic circuit diagram of a second embodiment of a hydraulic system in accordance with the present invention.

FIG. 3 shows an alternative embodiment of a hydraulic system in accordance with the present invention. As an alternative to the embodiment shown in FIG. 1, instead of the check valve 20, a check valve 44 is directly positioned at the outlet side 6 of the pump 2 and is directly connected to the tank 23. Pressure spikes occurring during the shifting of the valve piston 12 are directly released into the tank 23. In that way the safety of the system against pressure overload is assured. The check valve 22 that is connected to the tank 23 in the embodiment shown in FIG. 1 is shown in FIG. 3 as a check valve 45, so that the pressure difference at the orifice plate 14 is limited to a maximum pressure difference, and the excess volumetric flow at high engine speeds is thus not released into the tank 23, but is fed into the pressure accumulator 16. Thus, the pressure accumulator 16 can be filled more quickly at higher engine speeds than the orifice plate cross section of the orifice plate 14 would allow at a given pressure difference.

In FIG. 4 there is shown a modification of the hydraulic circuit embodiment shown in FIG. 3. It can be seen that the second control cylinder 34 is axially shortened at the position X as compared to the same element as shown in FIG. 3. Thereby one of the control edges can be omitted. Moreover, the second feedback surface is no longer disposed at the outer end of the valve piston 12, but is recessed within valve piston 12. That result is provided in that an inner piston 48, which is mounted to the valve housing, extends into the valve piston 12. The end face 29a of the inner piston 48 is acted upon through a transverse bore 47, which is also disposed in the valve piston 12. In that way, by the reduction of the area of the feedback surface 29a, the force level of the main spring is considerably reduced without changing the entire equilibrium of the valve. In other words, without changing the outer diameter of the valve piston 12, the force level can be specified by changing the diameter of the inner piston 48 alone.

A further optimization of the valve 11 is accomplished by removing the control edge between the pump 2 and the orifice plate 14 (see position X in FIG. 4). The segment cannot be closed any more at this location. When the valve switches to circulation without pressure (as it is shown in FIG. 4), only the check valve 13 closes, and not the valve piston 12, so that the accumulator 16 is not emptied through valve outlet 24 into the tank 23. The function and the disposition of the orifice plate 14 and the ball-spring-bypass through check valve 45 remain unchanged in their disposition and function.

Thus, additionally, a safety valve can be omitted (the check valve 44 of FIG. 3 and the check valve 20 of FIG. 1), which functions as a pressure limiting valve, because the system in this form opens in any event toward the tank when a pressure rise occurs in the accumulator, and the pump thus cannot make the accumulator burst. The only active control edge of the valve piston 12 opens in this case, which means that blocking of the valve piston 12 in the event of a pressure rise in the accumulator 16 can be excluded.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system comprising: a pump for feeding hydraulic fluid from a pump inlet side to a pump outlet side; a pressure accumulator disposed at the pump outlet side; a hydraulic control valve disposed between the pump outlet side and the pressure accumulator, wherein the hydraulic control valve includes at least two valve operating positions; wherein the pump outlet side is connected to the pump inlet side through the control valve in a first valve operating position; wherein the pump outlet side is connected to the pressure accumulator in a second valve operating position and is disconnected from the pressure accumulator in the first valve operating position; wherein the control valve includes a moveable member that determines the valve operating position, which movable member includes two feedback pressure surfaces facing in opposite directions and having respective different hydraulically effective surface areas; wherein a first feedback pressure surface having a smaller hydraulically effective surface area than a larger hydraulically effective surface area of the second feedback pressure surface is acted upon by a biasing force that is a function of the position of the movable member; an orifice plate disposed between the pump outlet and the second feedback pressure surface of the control valve, wherein the orifice plate is positioned between the control valve and the pressure accumulator; wherein the feedback pressure surface having the smaller hydraulically effective surface area is operatively connected to the pressure existing on an upstream side of the orifice plate and the pressure feedback surface having the larger hydraulically effective surface area is operatively connected to the pressure accumulator and is acted upon by the pressure on a downstream side of the orifice plate; and wherein the upstream side of the orifice plate that is connected to the control valve is connected to a tank through a check valve.

2. A hydraulic system in accordance with claim 1, wherein the valve operating position is controlled by a pressure in the pressure accumulator.

3. A hydraulic system in accordance with claim 1, wherein the movable member of the control valve includes a valve piston that has the oppositely-facing feedback pressure surfaces at its axial end surfaces with the different hydraulically effective surface areas, wherein the feedback surface having the smaller hydraulically effective surface area is acted upon by the force of a biasing spring, and wherein during movement of the valve piston in a direction in which the feedback pressure surface having the smaller hydraulically effective surface area faces, the first valve operating position is approached, and wherein during movement of the valve piston in a direction in which the feedback pressure surface having the larger hydraulically effective surface area faces, the second valve operating position is approached.

4. A hydraulic system in accordance with claim 1, wherein the movable member position is a function of a biasing force that acts on the feedback pressure surface having a smaller hydraulically effective surface area and a hydraulic pressure upstream of the orifice plate.

5. A hydraulic system in accordance with claim 4, wherein the movable member is a valve piston, wherein the biasing force is applied by a biasing spring; and wherein the second valve operating position is approached during movement of the valve piston in a direction that the feedback pressure surface having the larger hydraulically effective surface area faces, and the first valve operating position is approached during movement of the valve piston in a direction that the feedback pressure surface having the smaller hydraulically effective surface area faces.

6. A hydraulic system in accordance with claim 1, wherein the hydraulic system is disposed in a motor vehicle and the pump is driven directly by the crankshaft of an internal combustion engine.

7. A hydraulic system comprising: a pump for feeding hydraulic fluid from a pump inlet side to a pump outlet side; a pressure accumulator disposed at the pump outlet side; a hydraulic control valve disposed between the pump outlet side and the pressure accumulator, wherein the hydraulic control valve includes at least two valve operating positions; wherein the pump outlet side is connected to the pump inlet side through the control valve in a first valve operating position; wherein the pump outlet side is connected to the pressure accumulator in a second valve operating position and is disconnected from the pressure accumulator in the first valve operating position; wherein the control valve includes a moveable member that determines the valve operating position, which movable member includes two feedback pressure surfaces facing in opposite directions and having respective different hydraulically effective surface areas; wherein a first feedback pressure surface having a smaller hydraulically effective surface area than a larger hydraulically effective surface area of the second feedback pressure surface is acted upon by a biasing force that is a function of the position of the movable member; an orifice plate disposed between the pump outlet and the second feedback pressure surface of the control valve, wherein the orifice plate is positioned between the control valve and the pressure accumulator; wherein the feedback pressure surface having the smaller hydraulically effective surface area is operatively connected to the pressure existing on an upstream side of the orifice plate and the pressure feedback surface having the larger hydraulically effective surface area is operatively connected to the pressure accumulator and is acted upon by the pressure on a downstream side of the orifice plate; and wherein the upstream side of the orifice plate that is connected to the control valve is connected to the pump outlet side through a check valve.

8. A hydraulic system in accordance with claim 7, wherein the movable member position is a function of a biasing force that acts on the feedback pressure surface having a smaller hydraulically effective surface area, and a hydraulic pressure upstream of the orifice plate.

9. A hydraulic system in accordance with claim 8, wherein the movable member is a valve piston, wherein the biasing force is applied by a biasing spring; and wherein the second valve operating position is approached during movement of the valve piston in a direction that the feedback pressure surface having the larger hydraulically effective surface area faces, and the first valve operating position is approached during movement of the valve piston in a direction that the feedback pressure surface having the smaller hydraulically effective surface area faces.

10. A hydraulic system in accordance with claim 7, wherein the valve operating position is controlled by a pressure in the pressure accumulator.

11. A hydraulic system in accordance with claim 7, wherein the movable member of the control valve includes a valve piston that has the oppositely-facing feedback pressure surfaces at its axial end surfaces with the different hydraulically effective surface areas, wherein the feedback surface having the smaller hydraulically effective surface area is acted upon by the force of a biasing spring, and wherein during movement of the valve piston in a direction in which the feedback pressure surface having the smaller hydraulically effective surface area faces, the first valve operating position is approached, and wherein during movement of the valve piston in a direction in which the feedback pressure surface having the larger hydraulically effective surface area faces, the second valve operating position is approached.

12. A hydraulic system comprising: a pump for feeding hydraulic fluid from a pump inlet side to a pump outlet side; a pressure accumulator disposed at the pump outlet side; a hydraulic control valve disposed between the pump outlet side and the pressure accumulator, wherein the hydraulic control valve includes at least two valve operating positions; wherein the pump outlet side is connected to the pump inlet side through the control valve in a first valve operating position; wherein the pump outlet side is connected to the pressure accumulator in a second valve operating position and is disconnected from the pressure accumulator in the first valve operating position; wherein the control valve includes a moveable member that determines the valve operating position, which movable member includes two feedback pressure surfaces facing in opposite directions and having respective different hydraulically effective surface areas; wherein a first feedback pressure surface having a smaller hydraulically effective surface area than a larger hydraulically effective surface area of the second feedback pressure surface is acted upon by a biasing force that is a function of the position of the movable member; an orifice plate disposed between the pump outlet and the second feedback pressure surface of the control valve, wherein the orifice plate is positioned between the control valve and the pressure accumulator; wherein the feedback pressure surface having the smaller hydraulically effective surface area is operatively connected to the pressure existing on an upstream side of the orifice plate and the pressure feedback surface having the larger hydraulically effective surface area is operatively connected to the pressure accumulator and is acted upon by the pressure on a downstream side of the orifice plate; including a check valve that is connected between the upstream and downstream sides of the restriction.

13. A hydraulic system in accordance with claim 7, wherein the hydraulic system is disposed in a motor vehicle and the pump is driven directly by the crankshaft of an internal combustion engine.

14. A hydraulic system in accordance with claim 12, wherein the movable member of the control valve includes a valve piston that has the oppositely-facing feedback pressure surfaces at its axial end surfaces with the different hydraulically effective surface areas, wherein the feedback surface having the smaller hydraulically effective surface area is acted upon by the force of a biasing spring, and wherein during movement of the valve piston in a direction in which the feedback pressure surface having the smaller hydraulically effective surface area faces, the first valve operating position is approached, and wherein during movement of the valve piston in a direction in which the feedback pressure surface having the larger hydraulically effective surface area faces, the second valve operating position is approached.

15. A hydraulic system in accordance with claim 12, wherein the movable member position is a function of a biasing force that acts on the feedback pressure surface having a smaller hydraulically effective surface area, and a hydraulic pressure upstream of the orifice plate.

16. A hydraulic system in accordance with claim 15, wherein the movable member is a valve piston, wherein the biasing force is applied by a biasing spring; and wherein the second valve operating position is approached during movement of the valve piston in a direction that the feedback pressure surface having the larger hydraulically effective surface area faces, and the first valve operating position is approached during movement of the valve piston in a direction that the feedback pressure surface having the smaller hydraulically effective surface area faces.

17. A hydraulic system in accordance with claim 12, wherein the valve operating position is controlled by a pressure in the pressure accumulator.

18. A hydraulic system in accordance with claim 12, wherein the hydraulic system is disposed in a motor vehicle and the pump is driven directly by the crankshaft of an internal combustion engine.

19. A hydraulic system comprising: a pump for feeding hydraulic fluid from a pump inlet side to a pump outlet side; a pressure accumulator disposed at the pump outlet side; a hydraulic control valve disposed between the pump outlet side and the pressure accumulator, wherein the hydraulic control valve includes at least two valve operating positions; wherein the pump outlet side is connected to the pump inlet side through the control valve in a first valve operating position; wherein the pump outlet side is connected to the pressure accumulator in a second valve operating position and is disconnected from the pressure accumulator in the first valve operating position; wherein the control valve includes a moveable member that determines the valve operating position, which movable member includes two feedback pressure surfaces facing in opposite directions and having respective different hydraulically effective surface areas; wherein a first feedback pressure surface having a smaller hydraulically effective surface area than a larger hydraulically effective surface area of the second feedback pressure surface is acted upon by a biasing force that is a function of the position of the movable member; an orifice plate disposed between the pump outlet and the second feedback pressure surface of the control valve, wherein the orifice plate is positioned between the control valve and the pressure accumulator; wherein the feedback pressure surface having the smaller hydraulically effective surface area is operatively connected to the pressure existing on an upstream side of the orifice plate and the pressure feedback surface having the larger hydraulically effective surface area is operatively connected to the pressure accumulator and is acted upon by the pressure on a downstream side of the orifice plate: including a check valve that is connected between the pump outlet side and a hydraulic fluid tank.

20. A hydraulic system in accordance with claim 19, wherein the movable member position is a function of a biasing force that acts on the feedback pressure surface having a smaller hydraulically effective surface area, and a hydraulic pressure upstream of the orifice plate.

21. A hydraulic system in accordance with claim 20, wherein the movable member is a valve piston, wherein the biasing force is applied by a biasing spring; and wherein the second valve operating position is approached during movement of the valve piston in a direction that the feedback pressure surface having the larger hydraulically effective surface area faces, and the first valve operating position is approached during movement of the valve piston in a direction that the feedback pressure surface having the smaller hydraulically effective surface area faces.

22. A hydraulic system in accordance with claim 19, wherein the valve operating position is controlled by a pressure in the pressure accumulator.

23. A hydraulic system in accordance with claim 19, wherein the movable member of the control valve includes a valve piston that has the oppositely-facing feedback pressure surfaces at its axial end surfaces with the different hydraulically effective surface areas, wherein the feedback surface having the smaller hydraulically effective surface area is acted upon by the force of a biasing spring, and wherein during movement of the valve piston in a direction in which the feedback pressure surface having the smaller hydraulically effective surface area faces, the first valve operating position is approached, and wherein during movement of the valve piston in a direction in which the feedback pressure surface having the larger hydraulically effective surface area faces, the second valve operating position is approached.

24. A hydraulic system in accordance with claim 19, wherein the hydraulic system is disposed in a motor vehicle and the pump is driven directly by the crankshaft of an internal combustion engine.

* * * * *